No. 662,644. Patented Nov. 27, 1900.
C. B. GROFF.
RATCHET DRILL.
(Application filed Sept. 11, 1897.)

(No Model.) 4 Sheets—Sheet 1.

WITNESSES

INVENTOR.
Clarence B. Groff
BY
Francis D. Pastorius
ATTORNEY.

No. 662,644. Patented Nov. 27, 1900.
C. B. GROFF.
RATCHET DRILL.
(Application filed Sept. 11, 1897.)
(No Model.) 4 Sheets—Sheet 2.
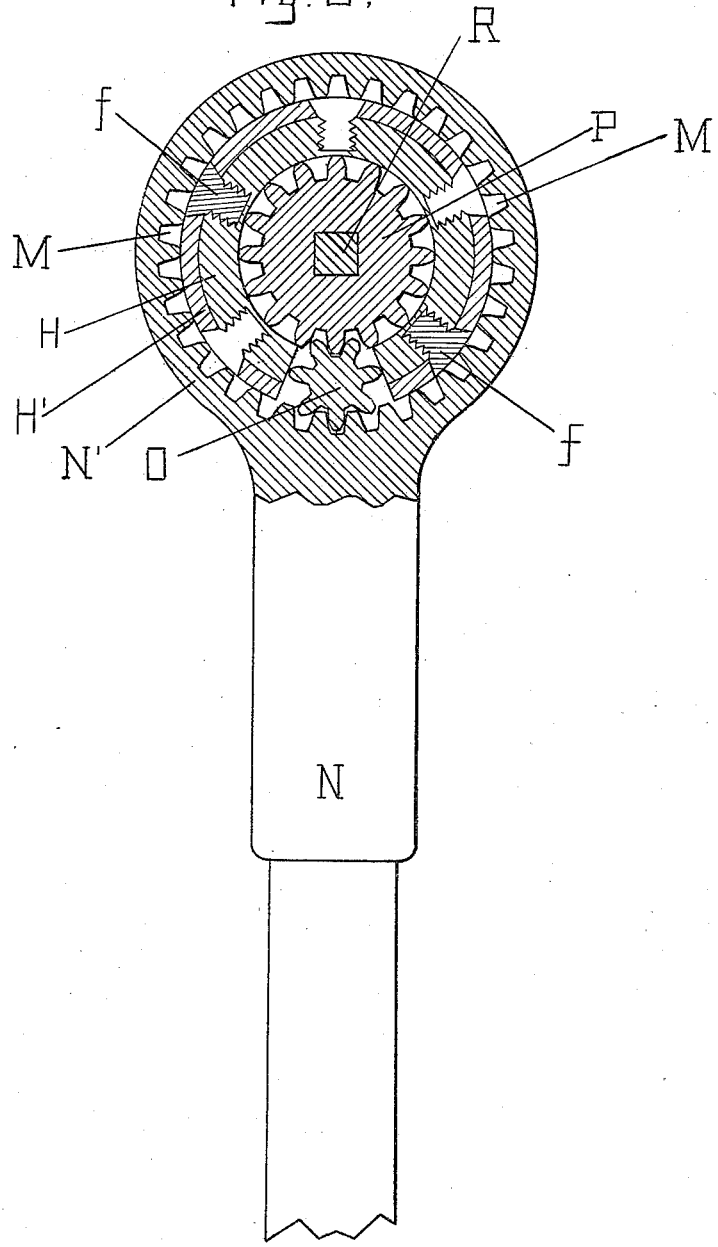
WITNESSES
INVENTOR.
Clarence B. Groff
BY
Francis D. Pastorius
ATTORNEY.

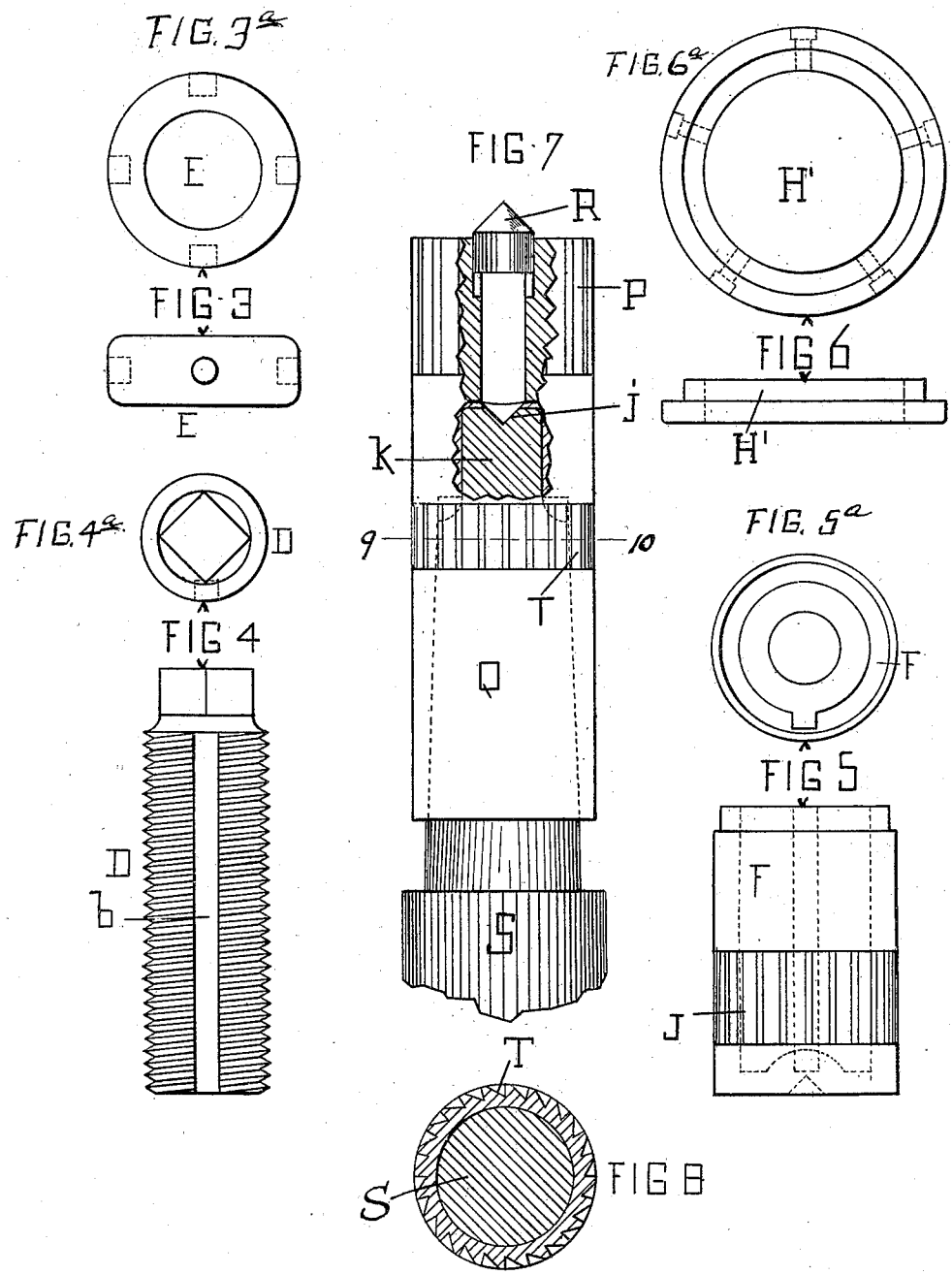

No. 662,644. Patented Nov. 27, 1900.
C. B. GROFF.
RATCHET DRILL.
(Application filed Sept. 11, 1897.)

(No Model.) 4 Sheets—Sheet 4.

WITNESSES
Allen R Sharpless
James F. Gannon

INVENTOR.
Clarence B. Groff
BY
Francis D. Pastorius
ATTORNEY.

UNITED STATES PATENT OFFICE.

CLARENCE B. GROFF, OF CAMDEN, NEW JERSEY.

RATCHET-DRILL.

SPECIFICATION forming part of Letters Patent No. 662,644, dated November 27, 1900.

Application filed September 11, 1897. Serial No. 651,273. (No model.)

*To all whom it may concern:*

Be it known that I, CLARENCE B. GROFF, a citizen of the United States, residing in the city and county of Camden, in the State of New Jersey, have invented a new and useful Improvement in Continuous Ratchet-Drills, which improvement is fully set forth in the following specification and accompanying drawings.

This invention has reference to what I term "continuous ratchet-drills," and relates to the mechanism by which a continuous right-hand rotation of the drill is produced by the intermittent right and left hand rotation of the operating-lever, or vice versa, and also to a construction whereby the drill can be readily removed from its socket.

To these and other useful ends my invention consists in the structural features hereinafter fully described and claimed.

Figure 1:
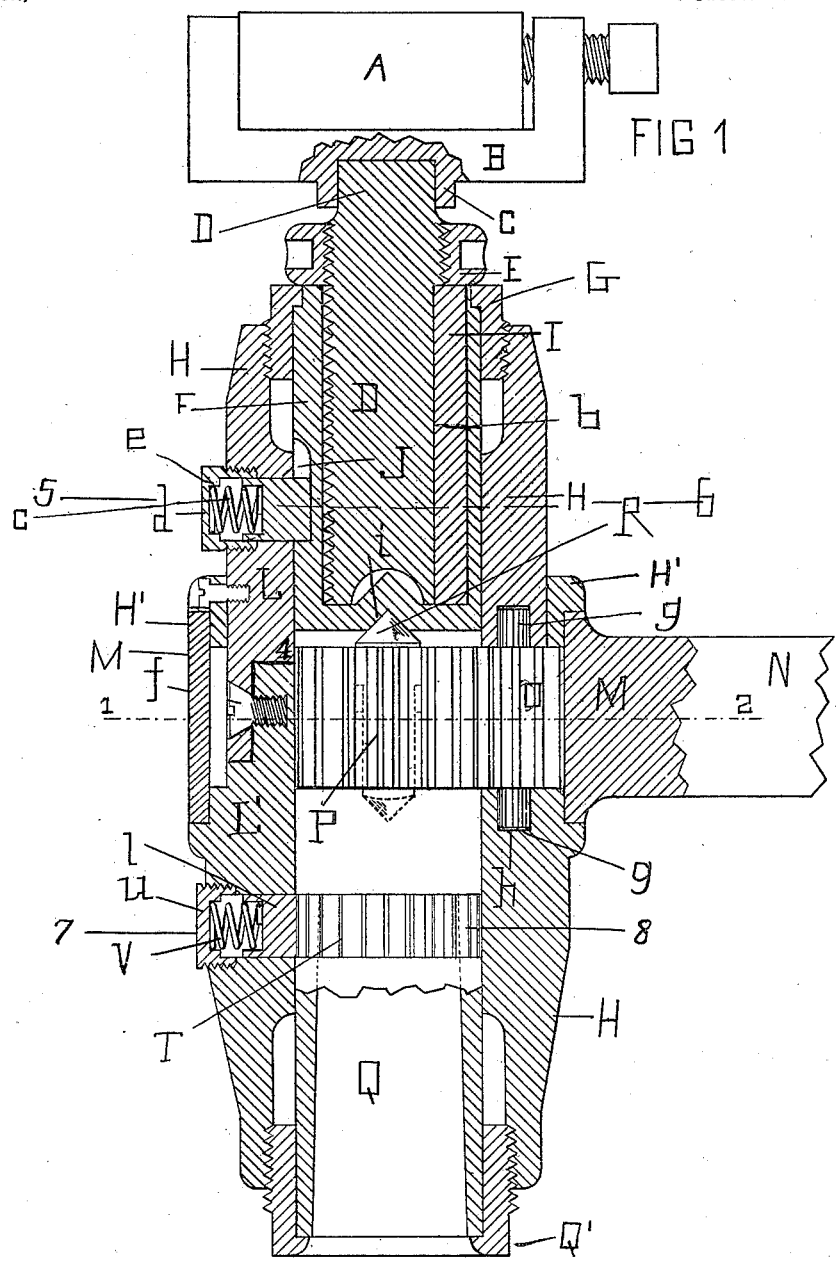
Figure 10:
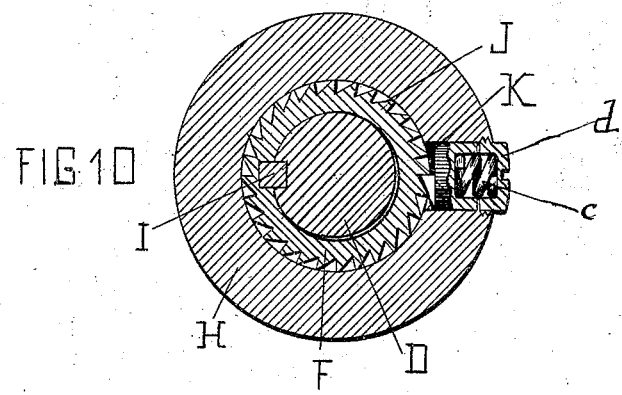
Figure 11:
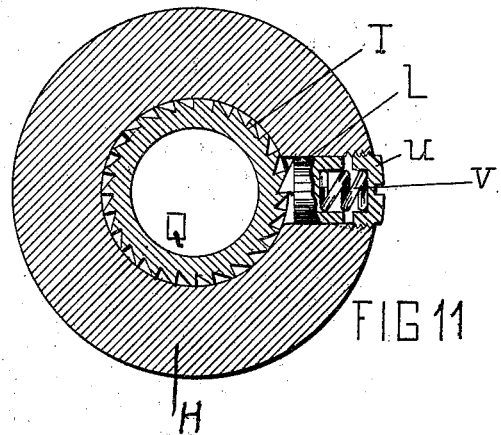

Figure 1 represents a central longitudinal section of a continuous ratchet-drill constructed in accordance with my invention, certain parts being shown in elevation. Fig. 2 represents a transverse section thereof on the line 1 2 of Fig. 1. Fig. 3 represents a side elevation of the feed-nut. Fig. 3$^a$ represents an end view thereof. Fig. 4 represents a side elevation of the feed-screw. Fig. 4$^a$ represents an end view thereof. Fig. 5 represents a side elevation of a sleeve that receives the feed-screw. Fig. 5$^a$ represents an end view thereof. Fig. 6 represents a side elevation of a collar that serves to confine the operating-lever. Fig. 6$^a$ represents an end view thereof. Fig. 7 represents a fragmentary detailed view of the drill-chuck and center pin partially broken away. Fig. 8 represents a transverse section thereof on the line 9 10 of Fig. 7. Fig. 9 represents a top plan view of a feed-screw that may be employed. Fig. 10 represents a transverse section taken on the line 5 6 of Fig. 1. Fig. 11 represents a transverse section taken on the line 7 8 of Fig. 1.

Similar letters of reference indicate corresponding parts in the figures.

Referring to the drawings, A designates an "old man" or bracket, and B a clamp secured thereto and of well-known construction.

C designates a socket in said clamp B to receive the head of the feed-screw D, (shown in Figs. 4 and 4$^a$,) or the head of the feed-screw may be provided with three points $a$, as shown in Fig. 9. The squared head or the points $a$ prevent rotation of the feed-screw, the socket C being unnecessary when the points are employed. The feed-screw D is provided with a longitudinal groove $b$, in which is situated the feather I of a sleeve F, Figs. 5 and 5$^a$, within which the feed-screw D is situated. The sleeve is closed at its lower end, and the feed-screw rests upon the same. The sleeve F is situated within the upper section L of the casing H, being held therein by a collar G, screw-threaded into the upper end of the casing and provided with a flange engaging an annular shoulder at the upper end of said sleeve. Above the sleeve and casing is a feed-nut E, Figs. 3 and 3$^a$, mounted upon the feed-screw D and bearing upon the upper end of the sleeve F, by means of which the drill is fed in an obvious manner. The said sleeve F, as shown in Figs. 1, 5, and 10, is provided with the ratchet-teeth J, inclined to the left, and mounted in the upper section L of the casing H, opposite said teeth J, is a pawl K, held in contact therewith by a spring $c$ and a cap $d$. The ratchet-teeth J are longer than the pawl K to allow relative longitudinal movement on the part of the sleeve F, hereinafter referred to.

The casing H in the instance illustrated consists of upper and lower sections L and L', respectively, the meeting ends of which overlap and are suitably fastened by screws $f$, as shown in Figs. 1 and 2, although it is understood that my invention is not confined to a casing so constructed. At about the central portion the casing is exteriorly provided with a bearing having a shoulder, the hub M of the operating-lever N being mounted upon said bearing. Said hub is retained in position by means of a collar H', Figs. 1, 6, and 6$^a$, that is secured to the casing above said head of the operating-lever. Said hub M is interiorly geared, and the casing is provided with an opening at one side thereof in which a pinion O is carried by trunnions $g$, mounted in the openings $h$, as shown in Fig. 1, the pinion meshing with said internal gear of the hub M.

The drill-socket Q is situated within the lower section L' of the casing H, being held in position by means of a collar Q', screw-threaded into the lower end of the casing and having a flange engaging the lower end of the drill-socket. At the upper end of the drill-socket is an opening to receive a center pin R, Fig. 7, the lower end of said center pin projecting into a socket in the upper end K of the drill S. This center pin R has a limited longitudinal movement relative to the drill-socket by means of its enlarged head, that is situated within the enlarged upper end of the opening in the drill-socket, while the upper end of the center pin is pointed and enters the socket $i$ in the closed lower end of the sleeve F. Opposite the pinion O the drill-socket is provided with a gear P, meshing therewith, and below said gear P the drill-socket is provided exteriorly with ratchet-teeth T, arranged oppositely to the ratchet-teeth J of the sleeve F and which are engaged by a pawl $l$, mounted in the lower section L' of the casing H, said pawl being held in engagement with said ratchet-teeth T by the spring $v$ and cap $u$.

The operation is as follows: The drill illustrated in the drawings is arranged to cause a continuous right-hand movement of the drill-socket and drill by intermittent right and left hand movement of the operating-lever to the right in Fig. 2. For instance, when the operating-lever is moved to the left its tendency is to cause the casing H to revolve in the same direction. This is resisted by the teeth J of the sleeve F, as will be apparent from Fig. 10, it being understood that the feed-screw D prevents the sleeve F from rotating. The movement of the lever N to the right in Fig. 2, therefore, will turn the gear-pinion O, carried by the sleeve, which in turn rotates the drill-socket, as will be apparent from Fig. 2, and thus cause the drill-socket and drill to turn to the left in Fig. 2, the pawl $l$ riding over the ratchet-teeth T. When the operating-lever N is moved to the left in Fig. 2, said operating-lever, casing, and drill-socket are locked together, because the tendency of the operating-lever, through the gear-pinion O and gear-teeth P, is to turn the drill-socket in the opposite direction, which is prevented by the engagement of the pawl $l$ with the ratchet-teeth T. The casing, drill-socket, and drill, therefore, move to the left with the lever N, the pawl K riding over the ratchet-teeth on the stationary sleeve F.

To avoid the usual practice of removing the drill from the drill-socket by prying or picking out the same with suitable teeth, I have arranged a construction by means of which the drill is dislodged by a blow upon the upper end of the feed-screw. When the drill is to be removed, the feed-nut E is unscrewed a little distance—say about three-sixteenths of an inch—away from the end of the sleeve F. A blow upon the upper end of the feed-screw will then cause it and the sleeve to move inwardly until the feed-nut encounters the end of the collar C, that holds the sleeve in place, the feed-screw and sleeve moving longitudinally owing to the difference in length between the ratchet-teeth J and pawl K, as described. The lower end of the sleeve F being in contact with the upper end of the center pin R, this pin is moved downwardly, and as the lower end of the same is in contact with the upper end of the drill the latter is forced from the socket Q.

Having thus described my invention, what I claim as new, and desire to secure by Letters Patent, is—

1. A ratchet-drill of the kind specified, comprising a casing, a support upon which said casing is rotatably mounted, a drill-socket carried by said casing and rotatable relative thereto, means for holding the casing against rotation upon said support in one direction, means for holding the casing and drill-socket against relative rotation when the casing is rotated in the opposite direction, and an operating-lever rotatably mounted upon said casing and geared to said drill-socket to cause the latter to rotate in the opposite direction to that in which said operating-lever is rotated.

2. A ratchet-drill of the kind specified, comprising a casing, a support upon which said casing is rotatably mounted, a drill-socket carried by said casing and rotatable relative thereto, means for holding the casing against rotation upon said support in one direction, means for holding the casing and drill-socket against relative rotation when the casing is rotated in the opposite direction, an operating-lever rotatably mounted upon said casing and provided with a gear, a pinion upon said casing meshing with said gear, and a gear upon said drill-socket meshing with said pinion.

3. A ratchet-drill of the kind specified, comprising a casing, a support upon which said casing is rotatably mounted provided with ratchet-teeth, a pawl carried by said casing and engaging said ratchet-teeth, a rotatable drill-socket carried by said casing and provided with ratchet-teeth extending oppositely to the ratchet-teeth of said support, a pawl mounted upon said casing and engaging said ratchet-teeth of the drill-socket, and an operating-lever rotatably mounted upon said casing and geared to said drill-socket to cause the same to rotate in the same direction when said operating-lever is rotated in either direction.

4. A ratchet-drill of the kind specified, comprising a casing, a sleeve rotatably mounted in one end thereof, a feed-screw situated within said sleeve, said feed-screw and sleeve having relative longitudinal movement but incapable of relative rotation, a feed-nut mounted upon said feed-screw and engaging said sleeve, a rotatable drill-socket carried by said casing, means for holding the casing against rotation upon said sleeve in one direction, means for holding the casing and drill-socket against relative rotation in the opposite direction, and an operating-lever rotatably mounted upon said casing and geared to said drill-socket to cause the same to rotate in the same direction when said operating-lever is rotated in either direction.

5. A ratchet-drill of the kind specified, comprising a casing, a rotatable sleeve mounted in one end thereof, a collar surrounding said sleeve and secured within the end of the casing, said collar engaging the said sleeve to prevent the same from movement outwardly with respect to the casing, a feed-screw and sleeve having relative longitudinal movement but incapable of relative rotation, a feed-nut mounted upon said feed-screw and engaging said sleeve, a rotatable drill-socket carried by said casing, means for holding the casing and sleeve against rotation in one direction, means for holding the casing and drill-socket against rotation in the opposite direction, and an operating-lever rotatably mounted upon said casing and geared to said drill-socket to cause the same to rotate in the same direction when said operating-lever is rotated in either direction.

6. In a ratchet-drill of the kind specified, a casing, provided with an exterior bearing, a shoulder at one end thereof, a collar secured to said casing at the other end of said bearing, and a rotatable operating-lever having its hub mounted upon said bearing and provided with an internal gear, a drill-socket carried by said casing and rotatable relative thereto, a support for said casing, and gearing meshing with the internal gear of said hub to cause the drill-socket to rotate in the same direction when the operating-lever is rotated in either direction.

7. In a ratchet-drill of the kind specified, a casing provided with a relatively longitudinally-movable feed-screw at one end, a feed-nut mounted thereon and adapted to move the casing longitudinally relative to said feed-screw, an internal longitudinally-immovable drill-socket at the other end of said casing, a longitudinally-movable member mounted in said drill-socket, and means for moving said member longitudinally relative to the drill-socket by reason of the longitudinal movement of the feed-screw.

8. In a ratchet-drill of the kind specified, a casing, a longitudinally-movable sleeve mounted in one end thereof, a relatively longitudinally-movable feed-screw mounted in said sleeve, a feed-nut upon said feed-screw engaging the end of said sleeve, a longitudinally-immovable drill-socket in the other end of said casing, a longitudinal movable member mounted in said drill-socket and engaging the lower end of said sleeve.

9. In a ratchet-drill of the kind specified, a casing, a sleeve rotatably mounted in one end thereof and provided with ratchet-teeth, a pawl carried by said casing and engaging said ratchet-teeth, the length of said teeth being greater than the width of the pawl, a longitudinal movable feed-screw mounted in said sleeve, said sleeve and feed-screw being incapable of relative rotation, a feed-nut upon said feed-screw engaging the end of said sleeve, a rotatable longitudinally-immovable drill-socket carried by said casing, an operating-lever mounted upon said casing and geared to the drill-socket, means for causing said drill-socket to be rotated in the same direction when the operating-lever is moved in either direction, and a longitudinally-movable pin or analogous member mounted in said drill-socket and engaging said sleeve.

In testimony whereof I affix my signature in presence of two witnesses.

CLARENCE B. GROFF.

Witnesses:
FRANCIS D. PASTORIUS,
B. D. ARCHER.